US012581310B2

(12) United States Patent
Gelardi et al.

(10) Patent No.: US 12,581,310 B2
(45) Date of Patent: Mar. 17, 2026

(54) PAIRING OF USER DEVICE WITH REMOTE SYSTEM

(71) Applicant: BRITISH TELECOMMUNICATIONS PUBLIC LIMITED COMPANY, London (GB)

(72) Inventors: Gabriele Gelardi, London (GB); Gery Ducatel, London (GB); Zhan Cui, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 202 days.

(21) Appl. No.: 17/926,502

(22) PCT Filed: May 14, 2021

(86) PCT No.: PCT/EP2021/062870
§ 371 (c)(1),
(2) Date: Nov. 18, 2022

(87) PCT Pub. No.: WO2021/233785
PCT Pub. Date: Nov. 25, 2021

(65) Prior Publication Data
US 2023/0189003 A1      Jun. 15, 2023

(30) Foreign Application Priority Data
May 22, 2020     (GB) ...................................... 2007639

(51) Int. Cl.
*H04W 12/50*          (2021.01)
*H04L 9/08*           (2006.01)
(52) U.S. Cl.
CPC ........... *H04W 12/50* (2021.01); *H04L 9/0827* (2013.01); *H04L 9/0866* (2013.01)

(58) Field of Classification Search
CPC .... H04W 12/50; H04L 9/0827; H04L 9/0866; H04L 63/0428; H04L 9/3226; H04L 63/0853; H04L 9/08
See application file for complete search history.

(56) References Cited

U.S. PATENT DOCUMENTS 9,729,528 B2     8/2017  Zakaria et al.
9,762,556 B2     9/2017  James et al.
(Continued)

FOREIGN PATENT DOCUMENTS

CN          110071901          7/2019
CN          111245619          6/2020
(Continued)

OTHER PUBLICATIONS

Examination Report for GB Application No. 2007639.4 dated Jul. 6, 2022, 4 pages.
(Continued)

*Primary Examiner* — Anh Nguyen
(74) *Attorney, Agent, or Firm* — Nixon & Vanderhye P.C.

(57)          ABSTRACT

A method of pairing a user device with a remote system. The user device communicates with an intermediary device via a secure communication channel to cause a secret key generated by the remote system to be received by the user device, from the intermediary device. The secret key is thereby assigned to the user device. The user device establishes communication with the remote system to pair the user device with the remote system using the secret key, such that data sent from the user device to the remote system is encrypted using the secret key and data received by the user device from the remote system is decrypted using the secret key.

14 Claims, 5 Drawing Sheets

(56)                    References Cited

U.S. PATENT DOCUMENTS

| | | | |
|---|---|---|---|
| 9,973,535 B2 | 5/2018 | Maher et al. | |
| 10,044,674 B2 | 8/2018 | Liu et al. | |
| 11,889,314 B2 * | 1/2024 | Yokum | H04W 12/069 |
| 2017/0169460 A1 | 6/2017 | Krakaris et al. | |
| 2017/0169640 A1 | 6/2017 | Britt | |
| 2018/0109418 A1 * | 4/2018 | Cammarota | H04W 12/50 |
| 2019/0081884 A1 * | 3/2019 | Spohn | H04L 45/124 |
| 2019/0097809 A1 | 3/2019 | Dan et al. | |
| 2019/0312888 A1 * | 10/2019 | Grimm | H04L 63/0272 |
| 2020/0221295 A1 * | 7/2020 | Altin | H04W 12/50 |
| 2023/0397001 A1 * | 12/2023 | Olshansky | H04W 12/0433 |

FOREIGN PATENT DOCUMENTS

| | | |
|---|---|---|
| GB | 2546494 | 7/2017 |
| WO | 2015/123678 | 8/2015 |
| WO | 2016/192387 | 12/2016 |

OTHER PUBLICATIONS

Combined Search and Examination Report for GB Application No. 2007639.4 dated Oct. 22, 2020, 5 pages.

International Search Report and Written Opinion of the ISA for PCT/EP2021/062870 dated Aug. 4, 2021, 13 pages Jamshiya P. K., et al., "Design of a Trusted Third Party Key Exchange Protocol for Secure Internet of Things (IoT)", Proceedings of the 2nd International Conference on Inventive Communi-cation and Computational Technologies (ICICCT 2018), IEEE, April 20, 2018, pp. 1834-1838 (5 pages).

Xiruo Liu, et al., "A Security Framework for the Internet of Things in the Future Internet Architecture", Future Internet, vol. 9, No. 27, Sep. 27, 2017, 28 pages.

Antonio L. Maia Neto, et al1., "AoT: Authentication and Access Control for the Entire IoT DeVice Life-Cycle", SenSys, Nov. 14-16, 2016, 15 pages.

Geoyandro C. C. F. Pereira, et al., "Performance evaluation of cryptographic algorithm over IoT Platforms and Operating Systems", Security and Communication Networks 2017 (Security and Privacy in Emerging Wireless Networks), vol. 2017, Article ID 2046735, Aug. 2017, 17 pages.

Saurabh Singh, et al., "Advanced lightweight encryption algorithms for IoT devices: survey, challenges and solutions", the Journal of Ambient Intelligence and Humanized and Computing, May 24, 2017, 18 pages.

Jani Suomalainen, "Smartphone Assisted Security Pairings for the Internet of Things", IEEE, 2014 4th International Conference on Wireless Communications, Vehicular Technology, Information Theory and Aerospace & Electronic Systems (VITAE), May 11-14, 2014, 5 pages.

International Preliminary Report on Patentability dated Dec. 1, 2022 issued for International Application No. PCT/EP2021/062870 (7 pages).

Communication pursuant to Article 94(3) EPC dated Oct. 16, 2025, issued in European Application No. 21 726 881.2 (9 pages).

* cited by examiner

100

104

110

106

108

102

PAIRING OF USER DEVICE WITH REMOTE SYSTEM

CROSS-REFERENCE TO RELATED APPLICATIONS

This application is the U.S. national phase of International Application No. PCT/EP2021/062870 filed May 14, 2021 which designated the U.S. and claims priority to GB Patent Application No. 2007639.4 filed May 22, 2020, the entire contents of each of which are hereby incorporated by reference.

FIELD OF INVENTION

The present invention relates to methods and systems for pairing a user device with a remote system.

BACKGROUND

An increasing number of devices are being provided with the means to communicate data. The Internet of Things (IoT) is a network of user devices such as home appliances, vehicles and other items embedded with electronics, software, sensors, actuators, and/or connectivity which enable these devices to connect with each other and/or other computer systems and exchange data.

Vulnerabilities in user devices risk being exploited by malicious parties. Pairing can be used to establish a secure association between two devices without a prior relationship. Secure pairing mechanisms are needed to prevent unauthorised individuals from gaining illegitimate access to the devices to be paired, for example via a man-in-the-middle (MITM) attack.

Some pairing mechanisms involve a user physically connecting the devices to be paired, for example using a cable. However, these mechanisms are impractical when the devices to be paired are located remotely from each other. This is especially so if it is difficult or inconvenient to move the devices, e.g. if they are heavy or bulky, such as a smart refrigerator, or if they are hardwired in a particular location. Even if devices to be paired are close to each other, such mechanisms rely on the devices to be paired having compatible interfaces, which may not be the case.

Other pairing mechanisms rely on a WiFi network generated by one of the devices itself. These device-generated WiFi networks are generally not encrypted, meaning that information shared via the WiFi network to establish the relationship between the devices to be paired may be intercepted and used by a malicious party as part of a MITM attack.

Yet further pairing mechanisms require a user to input information, such as a password, to a device to be paired to a remote device or system. A secure channel can then be created between the device and the remote system using known security protocols such as secure sockets layer (SSL) or transport layer security (TLS). However, this approach is prohibitive for many user devices, which tend to lack the computational power needed to handle asymmetric encryption such as that used in SSL or TLS. Furthermore, this approach requires preconfiguring the device appropriately, e.g. with a certificate, which increases complexity.

It is an aim of the present invention to at least alleviate some of the aforementioned problems.

Statements of Invention

According to a first aspect of the present disclosure, there is provided a method of pairing a user device with a remote system, the method comprising:

the user device communicating with an intermediary device via a secure communication channel to cause a secret key generated by the remote system to be received by the user device, from the intermediary device, the secret key thereby being assigned to the user device; and the user device establishing communication with the remote system to pair the user device with the remote system using the secret key, such that data sent from the user device to the remote system is encrypted using the secret key and data received by the user device from the remote system is decrypted using the secret key.

In some examples, the secret key is unique to the user device.

In some examples, the user device is connected to a network and the method comprises, after the user device is paired with the remote system, configuring the user device to prevent pairing of the user device with any user devices connected to a further network different from the network. In these examples, the configuring of the user device may be initiated in response to the user device being paired with the remote system. In these examples, after the configuring of the user device, the user device may receive a command from the remote system or the intermediary device to reconfigure the user device to allow pairing of the user device with another user device connected to the further network, wherein the command is encrypted using the secret key.

In some examples, the secure communication channel is a proximal field communication channel.

In some examples, the user device is a first user device, the secret key is a first secret key, and the method comprises: the first user device generating a second secret key; the first user device securely sending the second secret key to a second user device for the second user device to use in pairing of the second user device with the remote system; the first user device encrypting the second secret key using the first secret key to generate an encrypted second secret key; and the first user device sending the encrypted second secret key to the remote system for use in pairing of the second user device with the remote system.

In some examples, the user device is a first user device, and the method comprises the first user device sending the secret key to a second user device for the second user device to use in pairing of the second user device with the remote system.

In some examples, the user device receives a policy command from the remote system to configure the user device to comply with a usage policy.

In some examples, after the user device is paired with the remote system, the user device receives an intermediary secret key from the remote system for use in encrypting data sent from the user device to the intermediary device and decrypting data received by the user device from the intermediary device, wherein the intermediary secret key is encrypted using the secret key. In these examples, the intermediary secret key may be associated with a first usage policy and the method may comprise, in response to a usage policy associated with use of the user device changing from the first usage policy to a further usage policy different from the first usage policy, the user device receiving a further intermediary secret key from the remote system for use in encrypting data sent from the user device to the intermediary device. After the user device has received the further intermediary secret key, the user device may receive encrypted data from the intermediary device, the encrypted data encrypted using the intermediary secret key.

According to a second aspect of the present disclosure, there is provided a method of pairing a user device with a remote system, the method comprising:

an intermediary device communicating with the user device via a secure communication channel to initiate sending of a request for a secret key generated by the remote system;

the intermediary device securely sending the request for the secret key to the remote system;

the intermediary device securely receiving the secret key from the remote system;

the intermediary device sending the secret key to the user device via the secure communication channel, to assign the secret key to the user device, wherein the secret key is useable by the user device to establish communication with the remote system to pair the user device with the remote system, such that data sent from the user device to the remote system is encrypted using the secret key and data received by the user device from the remote system is decrypted using the secret key.

In some examples, the intermediary device comprises at least one of: a network device or a smartphone.

In some examples, the method comprises: the intermediary device obtaining a user credential associated with a user of the user device; the intermediary device authenticating the user credential with the remote system before the intermediary device sends the request for the secret key to the remote system. In these examples, the intermediary device obtaining the user credential may comprise the intermediary device receiving the user credential via a user interface of the intermediary device.

In some examples, the user device is one of a first group of user devices associated with a first usage policy, and the method comprises the intermediary device pairing at least one user device of a second group of user devices, different from the first group of user devices, with the remote system, the second group of user devices associated with a second usage policy different from the first usage policy.

In some examples, the intermediary device securely receives an intermediary secret key from the user device or the remote system for use in encrypting data sent from the intermediary device to the user device and decrypting data received by the intermediary device from the user device. In these examples, the intermediary secret key may be associated with a first usage policy and the method may comprise, in response to a usage policy associated with use of the user device changing from the first usage policy to a further usage policy different from the first usage policy, the intermediary device being unable to decrypt, using the intermediary secret key, further data received from the user device after the usage policy changing from the first usage policy to the further usage policy. After the usage policy changing from the first usage policy to the further usage policy, the intermediary device may receive a further intermediary secret key from the user device or the remote system, for use in decrypting the further data received from the user device.

According to a third aspect of the present disclosure, there is provided a method of pairing a user device with a remote system, the method comprising:

the remote system receiving, from an intermediary device via a secure communication channel, a request for a secret key for use in pairing the user device with the remote system;

in response to receiving the request, the remote system generating the secret key;

the remote system sending the secret key to the intermediary device, via the secure communication channel, for sending to the user device; and the user device establishing communication with the remote system to pair the user device with the remote system using the secret key, such that data sent from the user device to the remote system is encrypted using the secret key and data received by the user device from the remote system is decrypted using the secret key.

In some examples, the method comprises: the remote system determining a usage policy for usage of the user device; the remote system generating a further secret key based on the usage policy; and the remote system securely sending the further secret key to at least one of the intermediary device or a further intermediary device, for use by the at least one of the intermediary device or the further intermediary device in communicating with the user device in accordance with the usage policy.

In some examples, the method comprises, before the remote system receiving the request for the secret key: the remote system securely receiving, from the intermediary device, a request to authenticate a user credential associated with a user of the user device; the remote system authenticating the user credential; and the remote system sending an indication to the intermediary device that the user credential is authenticated.

According to a fourth aspect of the present disclosure, there is provided a data processing system comprising a processor to perform the method of any examples in accordance with the first, second or third aspects.

According to a fifth aspect of the present disclosure, there is provided a computer-readable medium storing thereon a program for carrying out the method of any examples in accordance with the first, second or third aspects.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

BRIEF DESCRIPTION OF THE DRAWINGS

The invention extends to methods and systems for pairing a user device with a remote system as described herein and/or substantially as illustrated with reference to the accompanying drawings. The present invention is now described, purely by way of example, with reference to the accompanying diagrammatic drawings, in which.

SPECIFIC DESCRIPTION

The following description is presented to enable any person skilled in the art to make and use the system, and is provided in the context of a particular application. Various modifications to the disclosed embodiments will be readily apparent to those skilled in the art.

Methods and systems in accordance with the present disclosure provide the ability to securely pair a user device with a remote system. By pairing the user device and the remote system, a security association with the user device and the remote system is established. The user device and the remote system can then securely communicate with each other.

The approaches herein involve the user device receiving a secret key from the remote system via an intermediary device, such as a network device, a mobile computing device or a smartphone. The user device then establishes communication with the remote system using the secret key, thereby pairing the user device and the remote system. This obviates the need to share knowledge (such as a key) with the user device prior to the pairing process. By controlling issuance of the secret key, the remote system can in turn control which user devices are permitted to pair with the remote system. The pairing can be performed straightforwardly and with reduced vulnerability of the system to a MITM attack than other pairing techniques.

Figure 1:
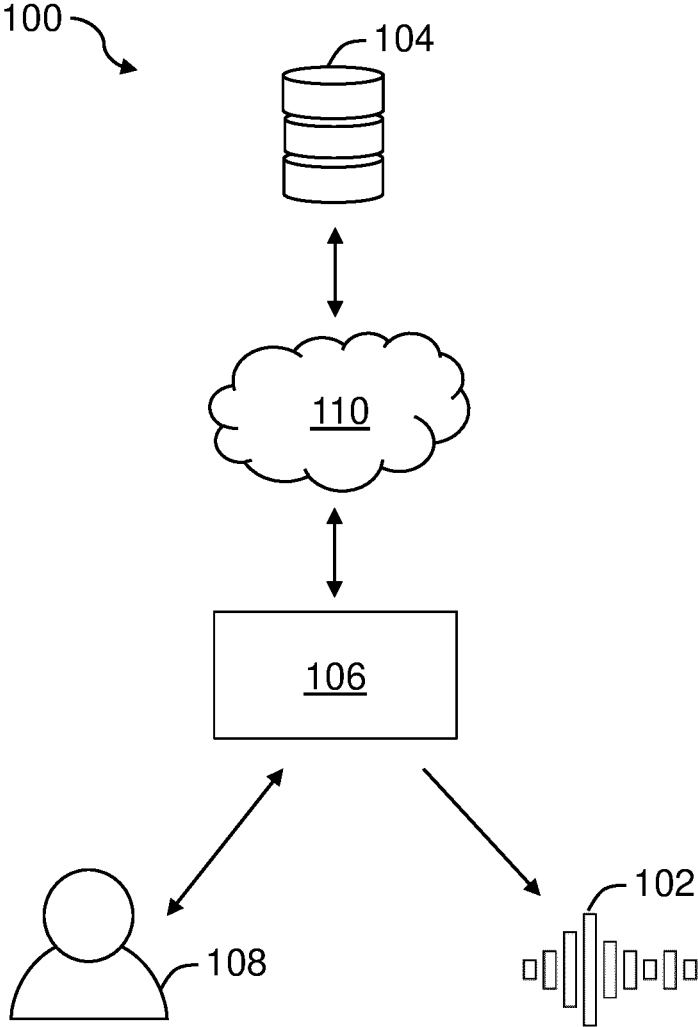
FIG. 1 is a schematic diagram of an example method of pairing a user device with a remote system.

FIG. 1 shows schematically an example method 100 of pairing a user device 102 with a remote system 104. The user device 102 is for example a device to be included in the IoT, which may be referred to as an IoT device. An IoT device is for example a device with the means to communicate data within the environment, e.g. over a network local to the environment. Examples of IoT devices include connected refrigerators, which can provide convenient online grocery shopping functionality, smart televisions (TVs) and voice assistant devices. The remote system 104 is for example a server system such as a cloud server system. The remote system 104 may (although need not) be a distributed system. The remote system 104 in this example is physically remote from the user device 102.

Pairing the user device 102 and the remote system 104 allows secure communication to be established between the user device 102 and the remote system 104. Prior to the pairing, the user device 102 and the remote system 104 are not in communication with each other. However, after pairing of the user device 102 and the remote system 104, the user device 102 and the remote system 104 can securely communicate with each other. For example, the user device 102 can securely send data obtained by the user device 102 to the remote system 104 for storage and/or processing. In turn, the remote system 104 can securely send commands and/or data to the user device 102, e.g. to control a functionality of the user device 102. The data transferred between the user device 102 and the remote system 104 is typically sensitive. Pairing the user device 102 and the remote system 104 using the methods described herein reduces the risk of a malicious user device being paired with the remote system 104, the user device 102 being paired with a malicious remote system and/or the data being intercepted by a malicious party compared to other pairing approaches.

In the method 100 of FIG. 1, the pairing is performed via an intermediary device 106. The intermediary device 106 is for example a portable device that can be easily brought into proximity with the user device 102 (although it need not be, e.g. if the user device 102 is portable instead).

For example, the intermediary device 106 may be a network device, a portable computing device (such as a tablet or laptop) or a smartphone. A network device is a device that provides an entry point to a network or that filters and/or routes network traffic, such as a router, gateway, switch, hub, access point or an edge device (which may be or comprise a router or routing switch).

In this example, a user 108 of the user device 102 is authenticated via the intermediary device 106 before the user device 102 is paired with the remote system 104. This allows the user 108 to verify their identity and thereby prove that they are authorised to pair the user device 102 with the remote system 104. In this way, unauthorised users can be prevented from pairing user devices with the remote system 104, improving the security of the system.

The authentication procedure in this case involves the user 108 entering a user credential via a user interface of the intermediary device 106. A user credential may be any suitable credential for proving the identity of the user. For example, the user credential may represent knowledge that is private to the user, such as a username and password or a personal identification number (PIN), or a characteristic that is unique to the user such as a biometric characteristic. For example, the user credential may include a fingerprint or image of the user 108, e.g. captured by a camera of the intermediary device 106.

Where the intermediary device 106 is a smartphone, the intermediary device 106 may include a suitable application that the user 108 can utilise to enter the user credential. The intermediary device 106 may instead receive the user credential via a different user interface such as a via a terminal or web browser, or via tactile input such as a button. The authentication process may be similar to or the same as a login procedure. For example, the user 108 may log in to a user account associated with the remote system 104, to authenticate the user 108.

The intermediary device 106 authenticates the user credential received from the user 108 with the remote system 104. In FIG. 1, the intermediary device 106 is already in secure communication with the remote system 104 so that the intermediary device 106 and the remote system 104 can communicate privately with each other. The secure communication between the intermediary device 106 and the remote system 104 may be secured using a suitable cryptographic protocol, e.g. an existing protocol based on asymmetric encryption.

In FIG. 1, the intermediary device 106 communicates with the remote system 104 via a network 110. The network 110 may be a single network or may include a plurality of networks. The network 110 may be or include a wide area network (WAN), a local area network (LAN) and/or the Internet, and may be a personal or enterprise network.

The remote system 104 securely receives a request from the intermediary device 106 to authenticate the user credential associated with the user 108, e.g. the username and password. Data may be considered to be sent or received securely for example where the data is transmitted in a manner that is resistant to unauthorised reading and/or modifying of the data. For example, the data may be encrypted or otherwise protected using a suitable cryptographic protocol, e.g. TLS, or the data may be transferred via a secure communication channel, which may be a hardware-based channel e.g. using a wired connection.

The remote system 104 then authenticates the user credential. For example, the remote system 104 may compare the user credential against a stored user credential associated with the user 108 that is stored within secure storage of the remote system 104 (e.g. in encrypted form or as a cryptographic hash of the user credential as input by the user 108). Authentication of the remote system 104 involves the remote system 104 verifying that the user credential received from the intermediary device 106 matches the stored user credential.

The authentication of the user 108 by the remote system 104 may also involve the remote system 104 verifying that the user 108 is permitted or otherwise authorised to pair a user device with the remote system 104. For example, the remote system 104 may store a list or other data structure comprising user data indicative of users that are authorised to pair user devices with the remote system 104. Such a list may be updated over time, as new users are authorised or as authorisation is removed from some users.

After the remote system 104 has authenticated the user credential, the remote system 104 securely sends an indication to the intermediary device 106 that the user credential is authenticated. Upon receipt of the indication at the intermediary device 106, the pairing process can begin, as the user 108 of the user device 102 has been confirmed as having the authority to pair the user device 102 with the remote system 104.

To pair the user device 102 with the remote system 104, the user device 102 communicates with the intermediary device 106 via a secure communication channel. Use of the secure communication channel improves the security of the system, and reduces the risk of a malicious party intercepting and/or tampering with the communication. In FIG. 1, the secure communication channel is a proximal field communication channel. A proximal field communication channel is typically a wireless communication channel that allows devices to communicate with each other when they are in close proximity to each other, without connecting to a network such as the Internet. NFC is an example of a proximal field communication channel, which currently operates over distances of less than around 20 centimetres. Bluetooth is another example of a proximal field communication channel, with a larger range than NFC of up to around 100 metres. Proximal field communication channels can in some cases be established automatically between two devices that each have appropriate hardware support, upon bringing the devices sufficiently close to each other. Hence, in the example of FIG. 1, the proximal field communication channel can be established automatically, once the user device 102 and the intermediary device 106 are in range of each other. This simplifies establishment of the secure communication channel between the user device 102 and the intermediary device 106 without sacrificing security. In this case, the proximal field communication channel can be established by moving the user device 102 so it is within range of the intermediary device 106 (e.g. if the user device 102 is a portable user device such as a wearable user device) and/or by moving the intermediary device 106 so it is within range of the user device 102 (e.g. if the intermediary device 106 is portable, such as a portable network device, a portable computing device or smartphone). Use of a proximal field communication channel obviates the need for additional hardware, which may increase costs. For example, smartphones (which may be used as an intermediary device 106) typically already have suitable hardware for communicating via a proximal field communication channel.

After establishing the secure communication channel between the user device 102 and the intermediary device 106, the user device 102 communicates with the intermediary device 106 via the secure communication channel to cause a secret key generated by the remote system 104 to be received by the user device 102. The secret key can then be used by the user device 102 to pair the user device 102 with the remote system 104. Prior to the pairing procedure, the user device 102 does not have a copy of the secret key. Hence, by obtaining the secret key from the intermediary device 106 during the pairing procedure, the secret key is thereby assigned to the user device 102. With this approach, the user device 102 need not be pre-loaded with the secret key. This provides more flexibility over the pairing process and improves security, as the allocation of secret keys to respective user devices can be performed at the time the pairing is performed.

The communication between the user device 102 and the intermediary device 106 to cause the receipt of the secret key by the user device 102 may be initiated by the user device 102 or by the intermediary device 106. For example, after authentication of the intermediary device 106, e.g. by the user logging into the intermediary device 106 by entering a suitable password, the communication may be initiated by bringing the user device 102 and/or the intermediary device 106 into range with each other for communication by a proximal field communication channel.

The communication between the user device 102 and the intermediary device 106 causes the intermediary device 106 to securely send a request for the secret key to the remote system 104. The request may be sent in the same manner as that used for communication between the intermediary device 106 and the remote system 104 to authenticate the user 108, e.g. with the request encrypted using a suitable asymmetric cryptographic protocol.

In response to receiving the request from the intermediary device 106, the remote system 104 generates the secret key. The secret key in this example corresponds to a symmetric cryptographic key for symmetric encryption of data transmitted between the remote system 104 and the user device 102 after pairing of the user device 102 with the remote system 104. The secret key is secret in that it is intended to be kept secret or otherwise private, in contrast to a public key of an asymmetric encryption protocol. Use of a secret key for encrypting and decrypting data transmitted between the remote system 104 and the user device 102 is typically less computationally intensive than using an asymmetric encryption protocol. This approach can therefore be used for secure communication between the remote system 104 and user devices 102 with limited storage and/or processing capabilities.

In this example 100, the secret key generated by the remote system 104 is unique to the user device 102. In other words, each user device that is paired to the remote system 104 is assigned a different respective secret key during the pairing process. This improves security, as it means that communications between each user device and the remote system 104 cannot be decrypted by other user devices.

The remote system 104 may also generate other data along with the secret key, such as identification data representative of an identifier associated with the user device 102. This facilitates future management of the user device 102. The secret key and the other data (if generated) are stored in storage of the remote system 104 in this example 100. For example, the remote system 104 may have a trusted hardware module or other storage system or environment for storing private data such as this. Such a trusted data store may be isolated from other, less secure, storage of the remote system 104, to reduce the risk of a malicious party gaining unauthorised access to the data stored in the trusted data store.

The remote system 104 securely sends the secret key to the intermediary device 106, e.g. in the same manner as that used for communication between the intermediary device 106 and the remote system 104 to authenticate the user 108. For example, the secret key may be encrypted by the remote system 104 using an asymmetric encryption protocol and then decrypted by the intermediary device 106.

The intermediary device 106 then sends the secret key to the user device 102 via the secure communication channel, which in FIG. 1 is a proximal field communication channel. The user device 102 receives the secret key and establishes communication with the remote system to pair the user device 102 with the remote system 104 using the secret key. By pairing the user device 102 with the remote system 104, a secure association between the user device 102 with the remote system 104 is established, using the secret key. After the user device 102 is paired with the remote system 104, data sent from the user device 102 to the remote system 104 is encrypted using the secret key and vice versa. Similarly, data received by the user device 102 from the remote system 104 (which was previously encrypted using the secret key) can be decrypted using the secret key. In this way, the user device 102 and the remote system 104 can communicate with each other in a secure manner.

Pairing of the user device 102 and the remote system 104 using this approach is straightforward and can be performed without directly authenticating the user device 102. Instead, trust is delegated to the intermediary device 106, which typically has greater computing power and/or a user interface that is easier to use than the user device 102. Use of the intermediary device 106 therefore allows the pairing to be performed securely and easily.

It is to be appreciated that encrypted data transmitted between the user device 102 and the remote system 104 after the user device 102 and the remote system 104 are paired may be transmitted via the intermediary device 106 but need not be. For example, where the user device 102 is connected to a local network and the intermediary device 106 is a smartphone, the encrypted data may be transmitted from the user device 102 to the remote system 104 via a network device of the local network (such as a router) rather than via the intermediary device 106. Where the intermediary device

106 is itself a network device, though, the encrypted data may be sent from the user device 102 to the remote system 104 via the intermediary device 106. In some cases, the secret key may also be used to encrypt and decrypt data transmitted between the user device 102 and the intermediary device 106. It need not be, though, as discussed further with reference to FIG. 4.

Referring back to FIG. 1, in this example 100, the user device 102 is configured to prevent a factory reset. For example, the user device 102 may lack the physical capabilities for such a factory reset, e.g. the user device may lack a reset button or firmware of the user device may be configured with a suitable mechanism to disable a factory reset unless such a reset is initiated by the remote system 104. This prevents a malicious party from performing a factory reset in order to pair the user device with a different network after it has already been paired with a given network. The security of the system is hence improved compared to existing systems, in which a malicious party who gains access to a user device can simply reset the user device and pair it anew with a device within their network.

In the example 100 of FIG. 1, the user device 102 is connected to a network, which may be a local network such as a network associated with a limited area such as a residence, workspace, building or set of buildings. After the user device 102 is paired with the remote system 104, the user device 102 is configured to prevent pairing of the user device 102 with any user devices connected to a further network different from the network. To enforce this policy, the user device 102 may be suitably configured, e.g. via firmware, to disable or otherwise prevent a configuration of the user device 102 from being changed unless certain conditions are satisfied. For example, the user device 102 may be configured to prevent such further pairing without entry of a password. If a malicious user nevertheless attempts to perform such further pairing, the user device 102 can be configured to delete all data stored thereon. In these examples, further pairing of the user device 102 may therefore be restricted to devices connected to the network. The configuring of the user device 102 in this way may be initiated in response to the user device 102 being paired with the remote system 104. For example, the configuring may occur automatically, once the user device 102 is paired with the remote system 104. This therefore reduces the risk of a malicious party pairing their device (which will typically be in a different network) with the user device 102.

In some cases, however, it may be desirable to allow the user device 102 to pair with a user device connected to a further network which is different from the network the user device 102 was connected to originally. This may be the case where, for example, the user moves house and wants to pair their user device 102 with other devices in a new local network associated with their new residence. In such cases, the user device 102 can be initially configured to prevent pairing of the user device 102 with any user devices connected to a further network different from the network to which the user device 102 is first connected. After the user has moved house, the user device 102 can then be reconfigured to allow pairing of the user device 102 with another user device connected to the new local network via a command encrypted using the secret key (which the user device 102 can decrypt using its own copy of the secret key). For example, the user device 102 may receive a command from the remote system 104 or from the intermediary device 106 to reconfigure the user device 106 to allow such a pairing. To initiate the sending of such a command, the user 108 may communicate with the remote system 104 and/or intermediary device 106, e.g. via a suitable application of the intermediary device 106 or another computing device accessible to the user 108, to request that the user device 102 be allowed to pair with the other user device.

Figure 2:
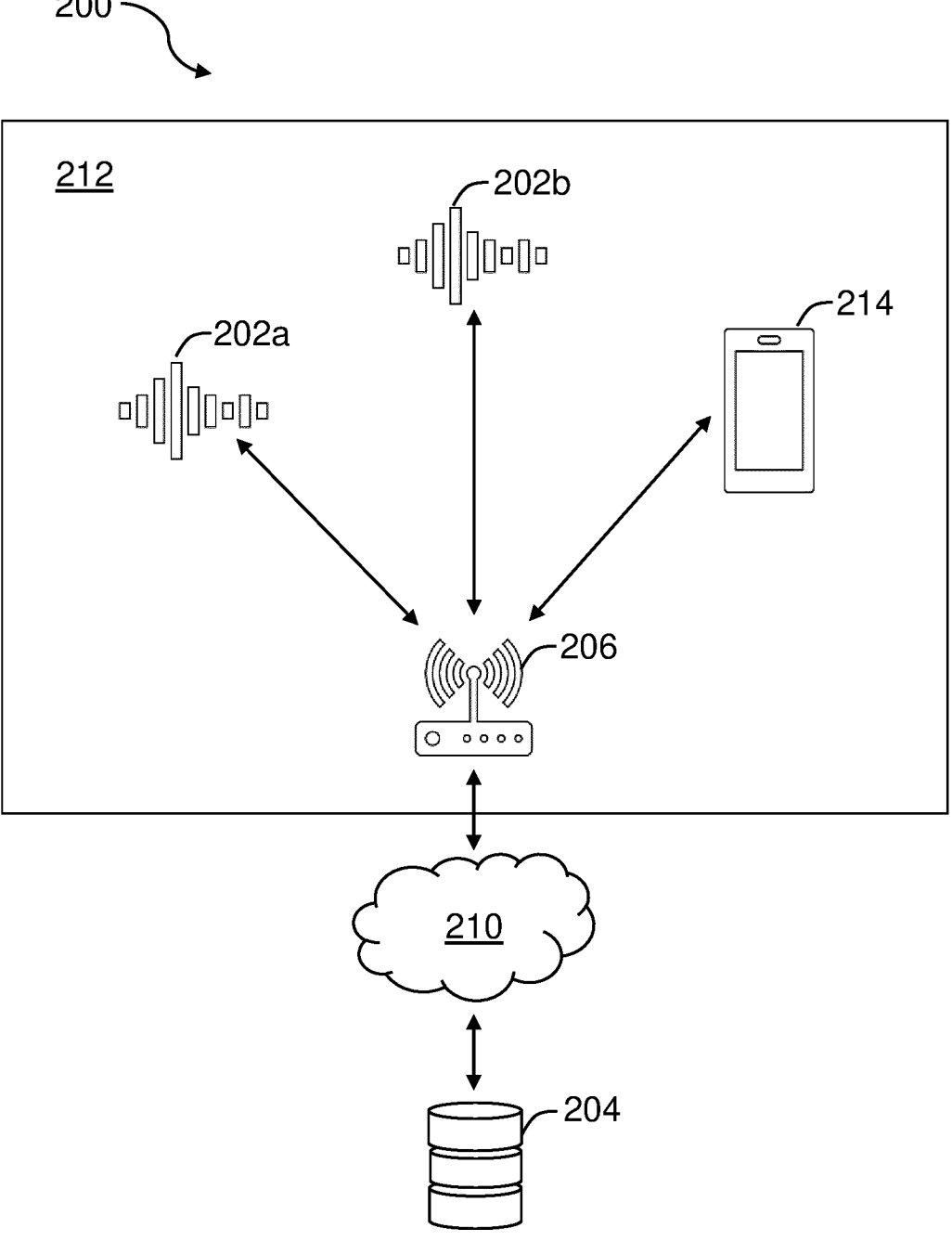
FIG. 2 is a schematic diagram of an example of communications between user devices and a remote system after pairing of the user devices with the remote system.

Turning to FIG. 2, FIG. 2 shows schematically an example 200 of communications between user devices 202a, 202b and a remote system 204 after pairing of the user devices with the remote system 204 via an intermediary device. The user devices 202a, 202b are connected to an access point 206 of a local network 212. The access point 206 is connected to a wider network 210, in order to communicate with the remote system 204.

After pairing of the user devices 202a, 202b with the remote system 204, e.g. as described with reference to FIG. 1, the first user device 202a encrypts data using a first secret key generated by the remote system 204 and the second user device 202b encrypts data using a second secret key generated by the remote system 204. The data encrypted by the user devices 202a, 202b is for example data obtained by the user devices 202a, 202b for sending to the remote system 204. For example, where a user device comprises a sensor, the data may represent sensor readings. The encrypted data obtained by the first and second user devices 202a, 202b is sent to the remote system 204 via the access point 206, and is decrypted by the remote system 204 using the first and second secret keys, respectively. The remote system 204 may then generate data and/or commands for sending to the first and/or second user devices 202a, 202b, which it encrypts using the first and second secret keys, respectively. The encrypted commands are sent to the first and/or second user devices 202a, 202b via the access point 206.

In the example 200 of FIG. 2, a smartphone 214 is also connected to the access point 206. Either the smartphone 214, the access point 206 or another device may have been used as the intermediary device to pair the first and/or second user devices 202a, 202b with the remote system 204. At least one of the user devices 202a, 202b and the smartphone 214 may transmit data to each other via the access point 206. Where the smartphone 214 has been used to pair the first and/or second user devices 202a, 202b with the remote system 204, the smartphone 214 may have a copy of the first and/or second secret keys, respectively. In these cases, data transmitted between the first and/or second user devices 202a, 202b and the smartphone 214 may be encrypted using the first and/or second secret key, respectively. In other cases, the smartphone 214 may communicate with at least one of the user devices 202a, 202b via the remote system 204. For example, the smartphone 214 may send data and/or commands securely to the remote system 204, e.g. using asymmetric encryption, for sending to at least one of the user devices 202a, 202b. The data and/or commands may then be sent to the at least one of the user devices 202a, 202b by the remote system 204, with the remote system 204 using the first secret key to encrypt communication with the first user device 202a and the second secret key to encrypt communication with the second user device 202b. In yet further cases, the smartphone 214 may communicate with at least one of the user devices 202a, 202b via a secure communication channel such as a proximal field communication channel. In this way, the smartphone 214 may be used by a user as an interface to interact with at least one of the user devices 202a, 202b.

As an example, if the first user device 202a is a smart thermostat, a user of the smartphone 214 may interact with an application associated with the smart thermostat provided by the smartphone 214 to provide a command to turn the heating on. Such an application may itself be hosted at the remote system 204. The smartphone 214 may encrypt the command using the first secret key and send the command to the first user device 202a, e.g. via the access point 206. The first user device 202a may then decrypt the command and respond appropriately to the command, in this case by turning the heating on. In other cases, though, such a command may be provided to the first user device 202a by the remote system 204 rather than the smartphone 214, or by the smartphone 214 via the remote system 204.

If the user replaces the smartphone 214 with a new smartphone, the user can initiate communication between the new smartphone and the first user device 202a via the remote system 204. In this case, the user can use the new smartphone to request the first secret key from the remote system 204. The remote system 204 can then provide the first secret key to the new smartphone, which can then use the first secret key to decrypt encrypted data sent by the first user device 202a. A similar approach can be used to re-initiate communication between the smartphone 214 and the first user device 202a and/or between the access point 206 and the first user device 202a, e.g. if the smartphone 214 and/or access point malfunction or otherwise lose access to the first secret key. It will be appreciated that a similar approach can be used to re-establish communication between the second user device 202b and the smartphone 214 and/or access point 206, but using the second secret key rather than the first secret key.

Different usage policies for usage of at least one of the user devices 202a, 202b or data obtained by at least one of the user devices 202a, 202b can be controlled by the remote system 204 by selective provision of the appropriate secret keys. For example, the remote system 204 may determine a usage policy for usage of a user device. Such a usage policy may be used to restrict communication with the user device to intermediary devices that comply with certain requirements e.g. that have a particular configuration or particular software stored thereon. Additionally or alternatively, such a usage policy may be used to limit access to data or functionality of the user device, e.g. so that a first intermediary device has access to first data of the user device whereas a second intermediary device has access to second data of the user device, which is different from the first data. In some cases, a user device provides attribute data representative of at least one attribute of the user device (e.g. representative of a configuration or functionality of the user device) to the remote system, which is encrypted using the secret key. The remote system may decrypt the attribute data and use it to ascertain an appropriate usage policy for the user device. In addition or instead, a computing device for accessing data and/or functionality of the user device, such as an intermediary device, may provide attribute data representative of at least one attribute of the computing device to the remote system, which may in turn be used in determining the usage policy. For example, the remote system may use attribute data associated with the computing device to determine whether the computing y device is to be granted access to data and/or functionality of the user device. Based on this, the remote system can determine whether to provide the secret key to the computing device, which can be used by the computing device to decrypt data encrypted by the user device using the secret key. For example, the remote system 204 may determine that the smartphone 214 is to be allowed to access data transmitted by the first user device 202a but not data transmitted by the second user device 202b. The smartphone 214 can hence be provided with the first secret key but not the second secret key.

The remote system 204 can generate a further secret key based on the usage policy, e.g. so that a user device paired with the remote system 204 using the secret key can use the secret key for encrypting less sensitive data that is intended to be accessible to a first set of computing devices and the user device can use the further secret key for encrypting more sensitive data that is intended to be accessible to a second set of computing devices. The further secret key can then be sent securely to the appropriate computing device(s) (e.g. the second set of computing devices rather than the first set), which may include the intermediary device used to pair the user device with the remote system 204. The further secret key can then be used by the second set of computing devices for communicating with the user device in accordance with the usage policy.

As an example, the first secret key initially generated by the remote system 204 for pairing the first user device 202a with the remote system 204 may be sent to both the access point 206 and the smartphone 214 so both the access point 206 and the smartphone 214 are able to decrypt data encrypted by the first user device 202a using the first secret key. However, the further secret key may be sent to the smartphone 214 without being sent to the access point 206. In this case, only the smartphone 214 will be able to decrypt data encrypted by the first user device 202a using the further secret key, restricting access to this data to the smartphone 214.

In these cases, it is to be appreciated that the further secret key is provided by the remote system 204 to the user device via any suitable means. For example, the further secret key may be encrypted by the remote system 204 using the originally generated secret key and sent to the user device for decryption using the original secret key.

The remote system 204 may instead or in addition enforce a usage policy for usage of a user device by sending a policy command to the user device. Such a policy command for example configures the user device to comply with the usage policy and may depend on user attributes associated with the user of the user device or contextual attributes such as a location of the user device or a time of usage of the user device. For example, the user device may be configured by the policy command such that the user device ceases to perform a particular functionality if the user device exits a designated geographical area.

Figures 3, 4:
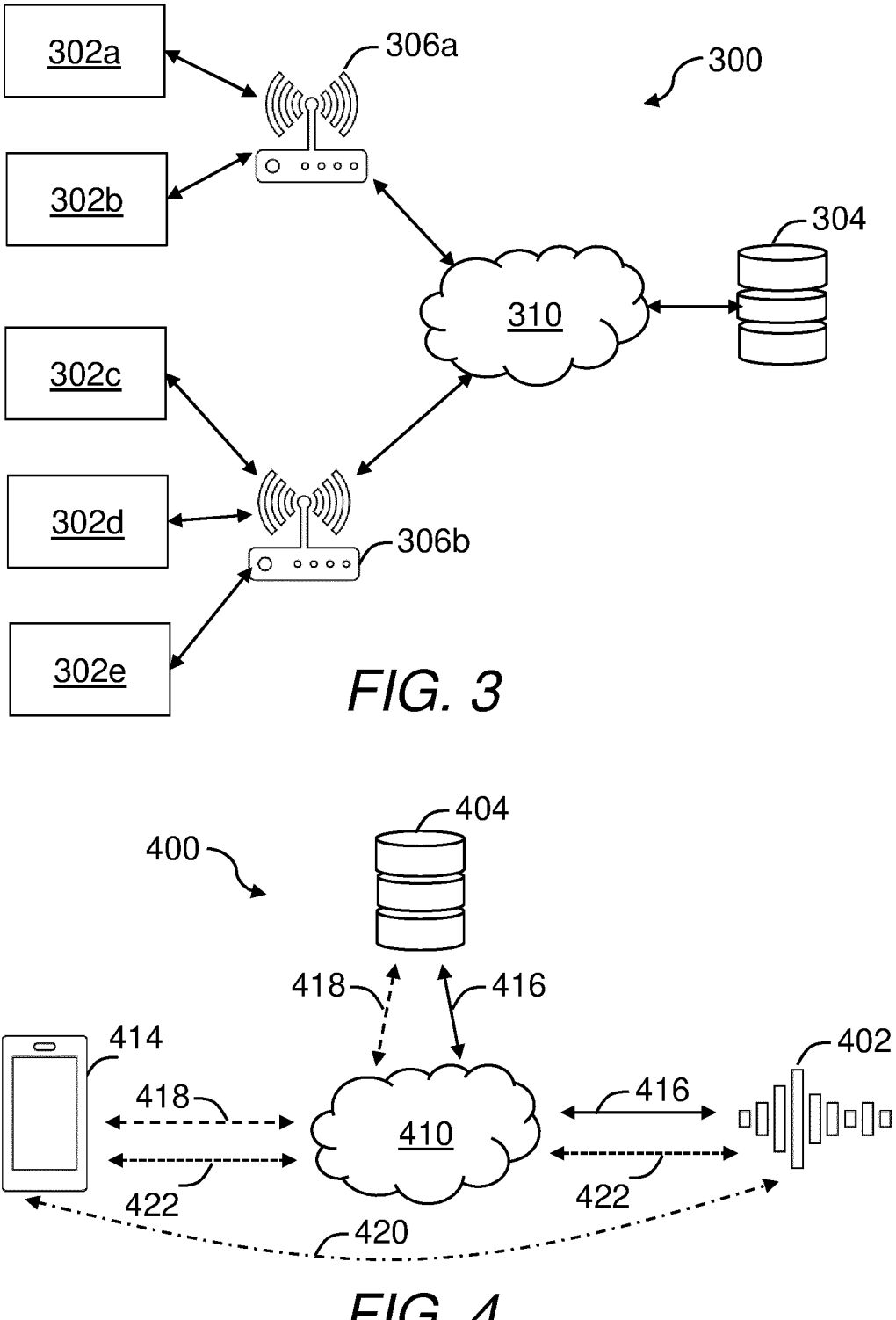
FIG. 3 is a schematic diagram of an example of communications between groups of user devices and a remote system.
FIG. 4 is a schematic diagram of an example of communications between a user device, a remote system and a smartphone after pairing of the user device with the remote system.

In some examples, there may be different usage policies for different groups of user devices. FIG. 3 shows such an example 300, and illustrates schematically communications between groups of user devices and a remote system 304. In the example 300 of FIG. 3, the first and second user devices 302a, 302b are paired with the remote system 304 using a first intermediary device, which in this case is a first network device 306a. Third, fourth and fifth user devices 302c-302e are paired with the remote system 304 using a second intermediary device, which in this case is a second network device 306b. The first and second network devices 306a, 306b are connected to a wider network 310 in order to communicate with the remote system 304 in FIG. 3. The pairing of the user devices is for example performed as described with reference to the example 100 of FIG. 1. In FIG. 3, each of the user devices 302a-302e is assigned a different respective secret key by the remote system 304, to improve security (although in some cases, some of the user devices may share a secret key, e.g. each of the user devices of a given group may be assigned the same secret key).

The first and third user devices 302a, 302c form a first group of user devices associated with a first usage policy, the second and fourth user devices 302b, 302d form a second group of user devices associated with a second usage policy, and the fifth user device 302e forms a third group of user devices associated with a third usage policy. In other words, the same intermediary device has been used to pair user devices associated with different usage policies with the remote system 304, which has assigned different respective secret keys to each of the user devices (and, conversely, different intermediary devices can be used to pair devices associated with the same usage policy with the remote system 304). This approach provides flexibility for pairing of user devices associated with different respective usage policies with the remote system 304.

Methods herein also provide flexibility for controlling usage of user devices after pairing with a remote system. FIG. 4 is a schematic diagram of an example 400 of communications between a user device 402, a remote system 404 and a smartphone 414 after pairing of the user device 402 with the remote system 404.

In FIG. 4, the user device 402 is paired with the remote system 404 via an intermediary device, which in this case is a smartphone 414, e.g. as described with reference to the example 100 of FIG. 1. After the user device 402 is paired with the remote system 404, the user device 402 receives an intermediary secret key from the remote system 404 for use in encrypting data sent from the user device 402 to the smartphone 414 and decrypting data received by the user device 402 from the smartphone 414. The intermediary secret key sent by the remote system 404 is encrypted using the secret key generated by the remote system 404 during the pairing process. Communication between the remote system 404 and the user device 402 encrypted using the secret key is indicated schematically in FIG. 4 by solid arrows 416 and, in this case, is via a network 410. The user device 402 can decrypt the intermediary secret key using the secret key obtained by the user device during the pairing process.

The smartphone 414 receives the intermediary secret key from the user device 402 or the remote system 404. This is shown schematically in FIG. 4, which indicates secure communication between the remote system 404 and the smartphone 414, e.g. for sending the intermediary secret key from the remote system 404 to the smartphone 414, using dashed arrows 418. The secure communication 418 between the remote system 404 and the smartphone 414 may be secured using a suitable cryptographic protocol, e.g. as explained with reference to the example 100 of FIG. 1. The user device 402 can also communicate securely with the smartphone 414, e.g. for sending the intermediary secret key to the smartphone 414, via a secure communication channel 420 such as a proximal field communication channel. In this way, the intermediary secret key may be sent to the smartphone 414 securely in two different manners. This is merely an example, though, and in other cases solely one of these communication means may be used to send the intermediary secret key to the smartphone 414.

Upon receipt of the intermediary secret key, the smartphone 414 can then use the intermediary secret key to encrypt data for sending to the user device 402 and to decrypt data received from the user device 402, e.g. via the network 410. Communication between the smartphone 414 and the user device 402 that is encrypted using the intermediary secret key is indicated in FIG. 4 using dotted arrows 422. This provides further flexibility for secure communication between the smartphone 414 and the user device 402. In particular, the intermediary secret key allows the smartphone 414 and the user device 402 to communicate securely, e.g. via the network 410, even if the secure communication channel 420 is unavailable. This may be the case for example where the secure communication channel 420 is a proximal field communication channel and a distance between the smartphone 414 and the user device 402 exceeds a range of the proximal field communication channel. Furthermore, use of a different secret key for encrypting communication 416 between the remote system 404 and the user device 402 and communication 422 between the user device 402 and the smartphone 414 enhances security of the system of a whole and allows communication between the remote system 404 and the user device 402 and between the user device 402 and the smartphone 414 to be controlled separately.

In some cases, issuance of an intermediary secret key by the remote system 404 may be used to enforce a usage policy for the user device 402, which may be a time-varying usage policy. In one case, the intermediary secret key is associated with a first usage policy for use of the user device 402. The first usage policy may be determined by the remote system 404, as described above with reference to FIG. 2. In response to a usage policy associated with use of the user device changing from the first usage policy to a further usage policy different from the first usage policy, the user device 402 receives a further intermediary secret key from the remote system 404 for use in encrypting data sent from the user device to the smartphone 414. The remote system 404 for example determines that the usage policy is to be changed from the first usage policy to the further usage policy. The usage policy may be changed in response to a change in an attribute of the user device 402 and/or smartphone 414 (e.g. as represented by attribute data communicated from the user device 402 and/or smartphone 414 to the remote system 404) and/or in response to an update applied at the remote system 404, which may impose a change in usage policy for the user device 402 even if a configuration of the user device 402 is unchanged. In some cases, the change in usage policy may be predetermined, e.g. such that the first usage policy is in force for a predetermined period of time, with the further usage policy coming into force after the predetermined period of time has elapsed.

The user device 402 then uses the further intermediary secret key to encrypt further data to be sent to the smartphone 414. However, until the smartphone 414 receives the further intermediary secret key, the smartphone 414 is unable to decrypt the further data. In other words, the intermediary secret key of the smartphone 414 does not allow the further data to be decrypted. In this way, two-way communication between the smartphone 414 and the user device 402 is limited. For example, the smartphone 414 may continue to use the intermediary secret key to encrypt data to be sent to the user device 402. The user device 402 can decrypt such data as it still includes a copy of the intermediary secret key. However, the further data, which is encrypted by the user device 402 using the further intermediary secret key, cannot be decrypted by the smartphone 414. This approach can be used e.g. where it is desired to restrict access to data and/or functionality of the user device 402 by the smartphone 414. For example, the smartphone 414 may be provided with access to the data of the user device 402 and/or be able to control a functionality of the user device 402 for a given period of time in which the intermediary secret key is used to encrypt and decrypt secure communication 422 between the user device 402 and the smartphone 414. However, at a certain point in time, the user device 402 may begin to encrypt further data with the further intermediary secret key, which the smartphone 414 is unable to decrypt. This can for example be used to implement leasing of the user device 402 to a user associated with the smartphone 414. In such cases, the smartphone 414 can decrypt data from the user device 402 using the intermediary secret key while the user (or their smartphone 414) complies with the terms of the lease. However, if the user ceases compliance with the terms of the lease, the user device 402 can encrypt further data using the further intermediary secret key, to prevent the user from accessing the data and/or functionality of the user device 402 via the smartphone 414.

In some cases, the user device 402 may encrypt the further data using the further intermediary secret key after the change in the usage policy but may also encrypt other data using the (existing) intermediary secret key. In such cases, the smartphone 414 can use the intermediary secret key to decrypt the other data but is unable to decrypt the further data (unless or until it receives the further intermediary secret key). In this way, this approach can be used in a flexible manner to apply various limitations or interruptions to data and/or functionality of the user device 402 accessible by a user.

It may be desired to lift restrictions in usage of the user device 402, e.g. if a user of the smartphone 414 who previously failed to comply with the terms of a lease of the user device 402 begins to comply with the terms. This may be considered to correspond to a further change in the usage policy, from the further usage policy to the first usage policy or to another usage policy that nevertheless allows the smartphone 414 to access at least some data and/or functionality of the user device 402. In these cases, the user device 402 and/or the remote system 404 may send the further intermediary secret key to the smartphone 414, e.g. in a similar manner to the sending of the intermediary secret key to the smartphone 414. The smartphone 414 may then use the further intermediary secret key to decrypt the further data received from the user device 402 (which was encrypted using the further intermediary secret key) and to encrypt data to be sent to the user device 402.

In some cases, the further intermediary secret key may be sent to the smartphone 414 by the user device 402 and/or the remote system 404 after the usage policy changes from the first usage policy to the further usage policy. This may be the case where the further usage policy allows the smartphone 414 to access at least some data and/or functionality of the user device 402. In such cases, the smartphone 414 may maintain access to at least some data and/or functionality of the user device 402 despite the change in the usage policy.

Figure 5:
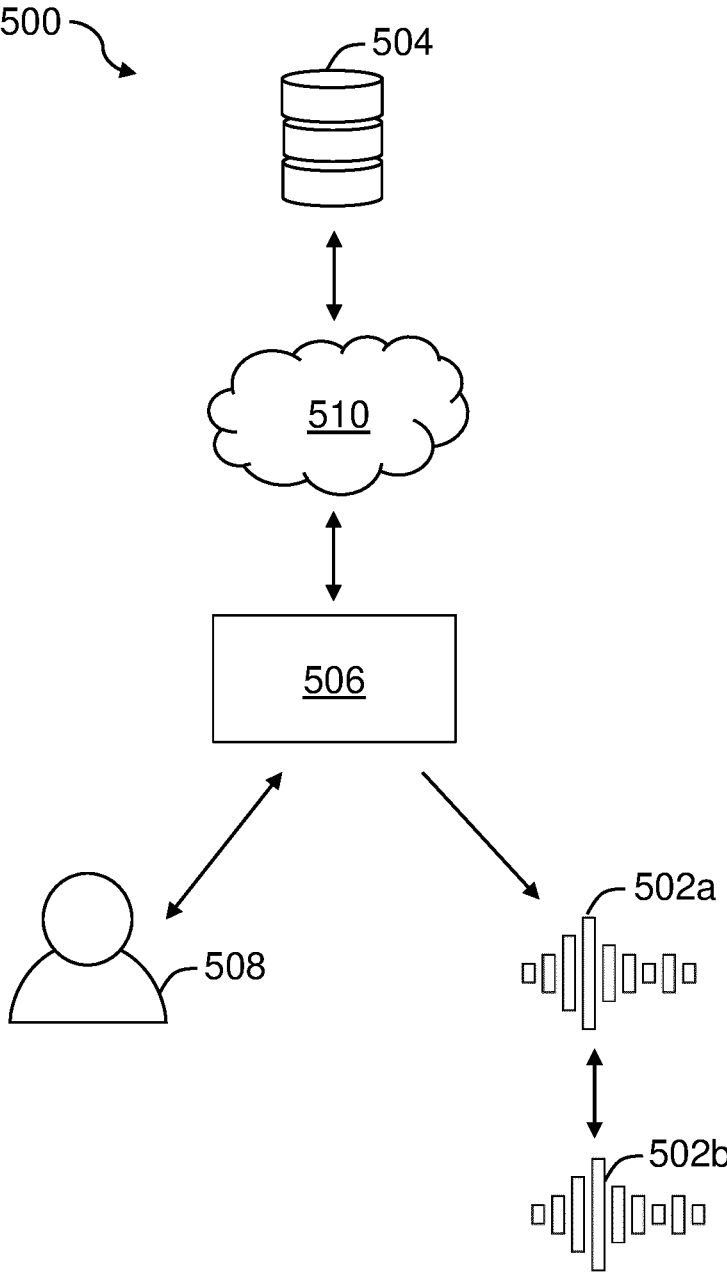
FIG. 5 is a schematic diagram of a further example method of pairing a user device with a remote system.

FIG. 5 is a schematic diagram of a further example 500 method of pairing a user device with a remote system 504. In the example 500 of FIG. 5, a user 508 undergoes an authentication process with an intermediary device 506 as described with reference to the example 100 of FIG. 1. The intermediary device 506 is used to pair a first user device 502*a* with the remote system 504 via a network 510 as described with reference to the example 100 of FIG. 1. The first user device 502*a* is then used to pair a second user device 502*b* with the remote system 504. In other words, the first user device 502*a* may be considered to proxy the function of the intermediary device 506 in pairing the second user device 502*b* with the remote system 504. In this way, a chain of trust can be created from the intermediary device 506, e.g. to create a chain of devices (such as the first user device 502*a*), which each become trusted intermediaries successively.

In this example, the first user device 502*a* is configured to store the secret key received from the remote system 504 in secure storage accessible to the first user device 502*a*. The first user device 502*a* can then send the secret key to the second user device 502*b* for the second user device to use in pairing of the second user device 502b with the remote system 504. The sending of the secret key to the second user device 502b may be initiated in any suitable way, such as in response to the first user device 502a being brought into communication with the second user device 502b, the first user device 502a determining that the second user device 502b has not yet been paired with the remote system 504 and/or the second user device 502b sending a request to the first user device 502a to be paired with the remote system 504 (which e.g. may be initiated by the user 508 in any suitable manner).

After the second user device 502b receives the secret key, the second user device 502b is paired with the remote system 504 e.g. in a similar manner to the pairing of the first user device 502a with the remote system 504. With this approach, both the first user device 502a and the second user device 502b can use the same secret key to encrypt data for sending to the remote system 504 and to decrypt data received from the remote system 504. The secret key may also be used to encrypt and decrypt data sent between the first user device 502a and the second user device 502b.

In other cases, the secret key used to pair the first user device 502a with the remote system 504 may be considered a first secret key, and the first user device 502a generates a second secret key and securely sends the second secret key to the second user device 502b for the second user device 502b to use in pairing of the second user device 502b with the remote system 504. The first user device 502a for example sends the second secret key to the second user device 502b via a proximal field communication channel, which may be used if the first user device 502a and the second user device 502b are sufficiently close to each other. In other cases, the second secret key may be sent to the second user device 502b via a different secure communication channel, such as a wired connection.

In these examples, the first user device 502a also encrypts the second secret key using the first secret key to generate an encrypted second secret key. The first user device 502a sends the encrypted second secret key to the remote system for use in pairing of the second user device with the remote system. The pairing of the second user device 502b with the remote system 504 with the second secret key is for example similar to the pairing of the first user device 502a with the remote system 504, but using the second secret key rather than the first secret key. Hence, after pairing of the second user device 502b with the remote system 504, the remote system 504 encrypts data for sending to the second user device 502b with the second secret key and decrypts data received from the second user device 502b with the second secret key. Similarly, the second user device 502b encrypts data for sending to the remote system 504 with the second secret key and decrypts data received from the remote system 504 with the second secret key. In this way, the second user device 502b and the remote system 504 can communicate securely with each other after pairing, without sending data via the first user device 502a and/or the intermediary device 506.

As will be appreciated, a new key can be generated at each level of a hierarchy of intermediary devices, forming a chain of trust for pairing a user device with the remote system 504. Each new key, e.g. the second secret key in this example, can be generated using a suitable key derivation function based on the first secret key, e.g. using HKDF (which is a key derivation function based on a hash-based message authentication code (HMAC) or using Diffie-Hellman key exchange. With this approach, the first and second user devices 502a, 502b can communicate securely with each other, e.g. to provide services to each other. A relationship between each of the keys in the hierarchy is maintained in this way, but without risking exposure of keys higher up in the hierarchy (e.g. the first secret key in this example). In other cases, though, at least one of the keys in a hierarchy may be generated randomly or otherwise independently of other keys in the hierarchy. For example, the second secret key may be independent of the first secret key.

In this example, the second secret key is generated by the first user device 502a. However, this is merely an example. In other cases, the second secret key may instead be generated by the remote system 504, e.g. in response to a request from the first user device 502a, which may be encrypted using the first secret key and initiated in various different ways, for example as described with reference to initiation of the sending of the secret key to the second user device 502b in other examples above. In cases in which the second secret key is generated by the remote system 504, the second secret key may be encrypted by the remote system 504 using the first secret key, and sent to the first user device 502a. The first user device 502a can decrypt the second secret key using the first secret key and then securely send the second secret key to the second user device 502b for use in pairing the second user device 502b with the remote system 504. In these cases, the first user device 502a need not send the second secret key to the remote system 504, as the remote system 504 already has a copy of the second secret key.

Figure 6:
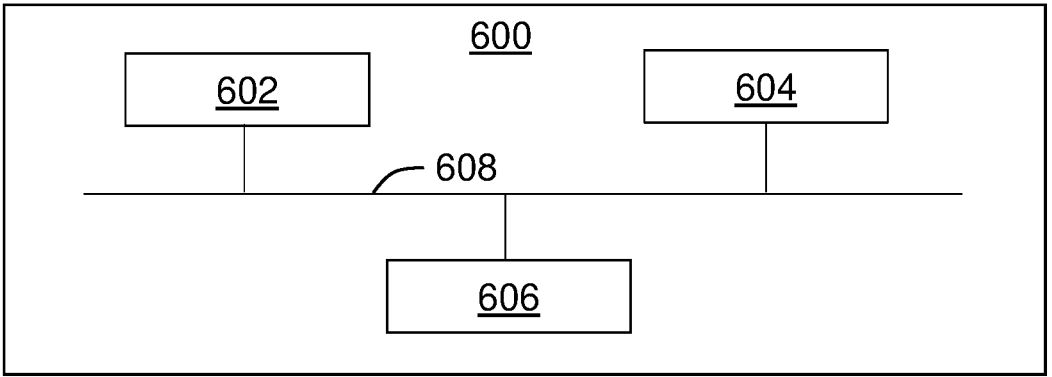
FIG. 6 is a schematic diagram of internal components of a data processing system according to an example.

FIG. 6 is a schematic diagram of internal components of a data processing system 600 that may be used in any of the methods described herein. The data processing system 600 may include additional components not shown in FIG. 6; only those most relevant to the present disclosure are shown. The data processing system 600 may be or form part of an intermediary device (e.g. a smartphone or network device), a remote system (e.g. a server system) or a user device. The data processing system 600 in FIG. 6 is implemented as a single computer device but in other cases a user device (and/or an intermediary device or a remote system) may be implemented as a distributed system.

The data processing system 600 includes storage 602 which may be or include volatile or non-volatile memory, read-only memory (ROM), or random access memory (RAM). The storage 602 may additionally or alternatively include a storage device, which may be removable from or integrated within the data processing system 600. For example, the storage 602 may include a hard disk drive (which may be an external hard disk drive such as a solid state disk) or a flash drive. The storage 602 is arranged to store data, temporarily or indefinitely. The storage 602 may be referred to as memory, which is to be understood to refer to a single memory or multiple memories operably connected to one another.

The storage 602 may be or include a non-transitory computer-readable medium. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

The data processing system 600 also includes at least one processor 604 which is configured for use in implementing the methods herein. The at least one processor 604 may be or comprise processor circuitry. The at least one processor 604 is arranged to execute program instructions and process data. The at least one processor 604 may include a plurality of processing units operably connected to one another, including but not limited to a central processing unit (CPU) and/or a graphics processing unit (GPU).

The data processing system 600 further includes a network interface 606 for connecting to at least one network. The components of the data processing system 600 are communicably coupled via a suitable bus 608.

As explained above, a data processing system such as the data processing system 600 of FIG. 6 may be or form part of a user device. Such a user device for example includes suitable hardware and/or software to establish the secure communication channel with an intermediary device, as described with reference to FIG. 1. For example, the user device may include an NFC hardware module to allow the user device to communicate with the intermediary device via NFC. The storage 602 of the user device in examples has sufficient capacity to store the secret key received from the remote system (via the intermediary device), typically alongside settings or other configuration data. The user device may have other communication capabilities such as a WiFi, Bluetooth or a port for a wired connection.

A data processing system such as the data processing system 600 of FIG. 6 may be or form part of an intermediary device. Such an intermediary device for example includes suitable hardware and/or software to establish the secure communication channel with an intermediary device, as described with reference to FIG. 1, e.g. an NFC hardware module. The intermediary device in examples includes a suitable interface for receiving the user credential, such as a touchscreen for receiving user input via user interaction with user interface displayed using the touchscreen, or a button.

Alternatives and Modifications

In the example of FIG. 1, the secure communication channel for communication between the user device 102 and the intermediary device 106 is a proximal field communication channel. In other cases, the secure communication channel may be a different communication channel, such as a wired communication channel via a suitable wired connection between the user device 102 and the intermediary device 106.

In FIG. 1, the user device 102 is configured to prevent a factory reset. This is merely an example, though, and in other cases a user device paired to a remote system as described herein may not be configured to prevent a factory reset.

It is to be appreciated that an approach similar to that of FIG. 4, in which at least one intermediary secret key is provided for use in encrypting data sent from the user device 402 to the smartphone 414 and decrypting data received by the user device from the smartphone 414, may equally be used to encrypt and/or decrypt data transferred between a user device and a different computing device than a smartphone, such as an intermediary device other than a smartphone, or a computing device that has not functioned as an intermediary device for pairing the user device 402 with the smartphone 414.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of pairing a user device with a remote system, wherein the user device is connected to a network, the method comprising:

the user device communicating with an intermediary device via a secure communication channel to cause a secret key generated by the remote system to be received by the user device, from the intermediary device, the secret key thereby being assigned to the user device;

the user device establishing communication with the remote system to pair the user device with the remote system using the secret key, such that data sent from the user device to the remote system is encrypted using the secret key and data received by the user device from the remote system is decrypted using the secret key;

configuring the user device, after the user device is paired with the remote system, to prevent pairing of the user device with any user devices connected to a further network different from the network; and the user device securely providing an intermediary secret key to the intermediary device, the intermediary secret key being configured to encrypt communicated between the user device and the intermediary device.

2. The method according to claim 1, wherein the secret key is unique to the user device.

3. The method according to claim 1, comprising initiating the configuring of the user device in response to the user device being paired with the remote system.

4. The method according to claim 1, comprising, after the configuring of the user device, the user device receiving a command from the remote system or the intermediary device to reconfigure the user device to allow pairing of the user device with another user device connected to the further network, wherein the command is encrypted using the secret key.

5. The method according to claim 1, wherein the secure communication channel is a proximal field communication channel.

6. The method according to claim 1, wherein the user device is a first user device, and the method comprises the first user device sending the secret key to a second user device for the second user device to use in pairing of the second user device with the remote system.

7. The method according to claim 1, comprising the user device receiving a policy command from the remote system to configure the user device to comply with a usage policy.

8. The method according to claim 1, comprising, after the user device is paired with the remote system, the user device receiving the intermediary secret key from the remote system for use in encrypting data sent from the user device to the intermediary device and decrypting data received by the user device from the intermediary device, wherein the intermediary secret key is encrypted using the secret key.

9. The method according to claim 8, wherein the intermediary secret key is associated with a first usage policy and the method comprises, in response to a usage policy associated with use of the user device changing from the first usage policy to a further usage policy different from the first usage policy, the user device receiving a further intermediary secret key from the remote system for use in encrypting data sent from the user device to the intermediary device.

10. The method according to claim 9, comprising, after the user device has received the further intermediary secret key, the user device receiving encrypted data from the intermediary device, the encrypted data encrypted using the intermediary secret key.

11. A data processing system comprising a processor to perform the method of claim 1.

12. A non-transitory computer-readable storage medium storing thereon a program for carrying out the method of claim 1.

13. A method of pairing a user device with a remote system, the method comprising:

the user device communicating with an intermediary device via a secure communication channel to cause a secret key generated by the remote system to be received by the user device, from the intermediary device, the secret key thereby being assigned to the user device; and the user device establishing communication with the remote system to pair the user device with the remote system using the secret key, such that data sent from the user device to the remote system is encrypted using the secret key and data received by the user device from the remote system is decrypted using the secret key;

wherein the user device is a first user device, the secret key is a first secret key, and the method comprises:

the first user device generating a second secret key;

the first user device securely sending the second secret key to a second user device for the second user device to use in pairing of the second user device with the remote system;

the first user device encrypting the second secret key using the first secret key to generate an encrypted second secret key; and the first user device sending the encrypted second secret key to the remote system, the encrypted second secret key being configured to pair the second user device with the remote system.

14. A method of pairing a user device with a remote system, the method comprising:

the remote system receiving, from an intermediary device via a secure communication channel, a request for a secret key configured to pair the user device with the remote system;

in response to receiving the request, the remote system generating the secret key;

the remote system sending the secret key to the intermediary device, via the secure communication channel, for sending to the user device; and the user device establishing communication with the remote system to pair the user device with the remote system using the secret key, such that data sent from the user device to the remote system is encrypted using the secret key and data received by the user device from the remote system is decrypted using the secret key;

wherein the user device is a first user device, the secret key is a first secret key, and the method comprises:

the first user device generating a second secret key;

the first user device securely sending the second secret key to a second user device for the second user device to use in pairing of the second user device with the remote system;

the first user device encrypting the second secret key using the first secret key to generate an encrypted second secret key; and the first user device sending the encrypted second secret key to the remote system, the encrypted second secret key being configured to pair the second user device with the remote system.

\* \* \* \* \*